United States Patent
Yoo et al.

(10) Patent No.: US 12,556,477 B2
(45) Date of Patent: Feb. 17, 2026

(54) APPARATUS AND METHOD FOR PROVIDING DYNAMIC NETWORK PROGRAMMING BASED ON SELECTIVE BINDING SEGMENT OF SEGMENT ROUTING IN COMMUNICATION SYSTEM

(71) Applicant: ELECTRONICS AND TELECOMMUNICATIONS RESEARCH INSTITUTE, Daejeon (KR)

(72) Inventors: Hyun Kyung Yoo, Daejeon (KR); Namseok Ko, Daejeon (KR); Sung Hyuk Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 367 days.

(21) Appl. No.: 18/208,436

(22) Filed: Jun. 12, 2023

(65) Prior Publication Data
US 2024/0137316 A1  Apr. 25, 2024
US 2024/0235998 A9  Jul. 11, 2024

(30) Foreign Application Priority Data
Oct. 19, 2022 (KR) .......... 10-2022-0135268
Dec. 23, 2022 (KR) .......... 10-2022-0182731

(51) Int. Cl.
*H04L 45/74* (2022.01)
(52) U.S. Cl.
CPC ................. *H04L 45/74* (2013.01)

(58) Field of Classification Search
None
See application file for complete search history.

(56) References Cited

U.S. PATENT DOCUMENTS 10,516,610 B2 * 12/2019 Filsfils .............. H04L 45/74
12,081,435 B2 *  9/2024 Narasimhan ...... H04L 45/02
(Continued)

FOREIGN PATENT DOCUMENTS

KR       10-1279500 B1    6/2013
KR   10-2020-0019256 A    2/2020
(Continued)

*Primary Examiner* — Lonnie V Sweet
(74) *Attorney, Agent, or Firm* — LRK PATENT LAW FIRM

(57) ABSTRACT

An apparatus and method for providing dynamic network programming based on a selective binding segment of segment routing in a communication system is provided. A method by which a first service programmable network (SPN) node operates in a communication system includes: receiving a first packet from a zeroth SPN node; identifying a segment routing header (SRH) of the first packet, the SRH including a segment list; identifying a selective binding segment based on the segment list; requesting a processing result from a network service function (NSF) corresponding to the segment list when the segment list involves the selective binding segment; receiving a color value according to the processing result from the NSF; dynamically selecting a segment list according to the color value; and transmitting a second packet, to which a new SRH including the selected segment list and a new header are added, to a second SPN node.

16 Claims, 8 Drawing Sheets

(56) References Cited

U.S. PATENT DOCUMENTS

| | | | |
|---|---|---|---|
| 12,126,533 B2* | 10/2024 | Zhang | H04L 63/0272 |
| 2009/0128324 A1 | 5/2009 | Kim et al. | |
| 2016/0302121 A1 | 10/2016 | Kim | |
| 2018/0034727 A1* | 2/2018 | Nainar | H04L 45/74 |
| 2018/0109450 A1* | 4/2018 | Filsfils | H04L 45/04 |
| 2021/0083933 A1* | 3/2021 | Bull | H04L 41/0806 |
| 2021/0385150 A1* | 12/2021 | Shrivastava | H04L 45/34 |
| 2022/0141120 A1* | 5/2022 | Dong | H04L 45/50 |
| | | | 370/401 |
| 2022/0278923 A1* | 9/2022 | Peng | H04L 45/34 |
| 2022/0286395 A1 | 9/2022 | Gandhi et al. | |
| 2022/0294729 A1* | 9/2022 | Clad | H04L 45/3065 |
| 2023/0141362 A1* | 5/2023 | Mittal | H04L 45/50 |
| | | | 370/389 |
| 2023/0146226 A1* | 5/2023 | Sivabalan | H04L 45/34 |
| | | | 370/254 |
| 2023/0269167 A1* | 8/2023 | Bhargava | H04L 45/34 |
| | | | 709/238 |
| 2023/0419235 A1* | 12/2023 | Cui | G06Q 10/083 |
| 2024/0154902 A1* | 5/2024 | Chen | H04L 45/00 |
| 2024/0297844 A1* | 9/2024 | Xie | H04L 45/741 |
| 2025/0030630 A1* | 1/2025 | Li | H04L 45/34 |
| 2025/0039106 A1* | 1/2025 | Liu | H04L 45/34 |

FOREIGN PATENT DOCUMENTS

| | | |
|---|---|---|
| KR | 10-2021-0102107 A | 8/2021 |
| KR | 10-2022-0052371 A | 4/2022 |

\* cited by examiner

Function FORWARDING INFORMATION
  F2: 192.0.1.1, ......
  Fx: 192.0.2.1, ......

SR Policy POL10
BSID: C100:
Candidate-Path CP1
  Preference 200
  Selection-Mode 1
    SR Policy <Color = 100>, Weight W1
    SR Policy <Color = 200>, Weight W2
  Candidate-Path CP2
    Preference 100
    Selection-Mode 0
      SR Policy <Color = 300>, Weight W1
      SR Policy <Color = 400>, Weight W2

SR Policy POL100
  <Color = 100> IDS <S1, S3, S5>
SR Policy POL200
  <Color = 200> non-IDS <S2, S4>

(51)

| IPv6 Hdr | SA=C::, DA=S1 |
|---|---|
| SRH | (S5::, S3::, S1::), SL=2 |
| IPv6 Hdr | SA=A::, DA=D:: |
| SRH | (D::, C100::, CF2::, BF1::), SL=0 Context TLV |
| Payload | |

(52)

| IPv6 Hdr | SA=C::, DA=S3 |
|---|---|
| SRH | (S5::, S3::, S1::), SL=2 |
| IPv6 Hdr | SA=A::, DA=D:: |
| SRH | (D::, C100::, CF2::, BF1::), SL=0 Context TLV |
| Payload | |

(53)

| IPv6 Hdr | SA=C::, DA=S5 |
|---|---|
| SRH | (S5::, S3::, S1::), SL=2 |
| IPv6 Hdr | SA=A::, DA=D:: |
| SRH | (D::, C100::, CF2::, BF1::), SL=0 Context TLV |
| Payload | |

(54)

| IPv6 Hdr | SA=A::, DA=D:: |
|---|---|
| SRH | (D::, C100::, CF2::, BF1::), SL=0 Context TLV |
| Payload | |

APPARATUS AND METHOD FOR PROVIDING DYNAMIC NETWORK PROGRAMMING BASED ON SELECTIVE BINDING SEGMENT OF SEGMENT ROUTING IN COMMUNICATION SYSTEM

CROSS-REFERENCE TO RELATED APPLICATIONS

This application claims priority to Korean Patent Applications No. 10-2022-0135268 filed on Oct. 19, 2022 and Korean Patent Applications No. 10-2022-0182731 filed on Dec. 23, 2022, which is hereby incorporated by reference in its entirety.

BACKGROUND

1. Field of the Invention

The present disclosure relates to a communication system, and more specifically, to an apparatus and method for providing dynamic network programming based on a selective binding segment of segment routing in a communication system.

2. Description of Related Art

With the proliferation of 5G and 6G technologies, various application services, such as immersive extended reality (XR), vehicle-to-everything (V2X), and unmanned aerial vehicle (UAV) are becoming widespread, and network requirements for services such as bandwidth, latency, availability, security, and the like are also becoming more diverse.

In addition, as more and more traffic is required to have high quality, it has become important to have network technologies capable of dynamically providing an optimal network service function (NSF) according to characteristics of application services and network requirements.

In order to realize the network technologies, there is a need for a network service programming technology in which network resource information is shared along with characteristics and state information of NSFs, based on which various network services are dynamically programed and delivered.

SUMMARY OF THE INVENTION

Based on the above discussion, the present disclosure provides an apparatus and method for, in order to provide optimal connectivity according to various service characteristics and network requirements in a communication system, dynamically providing network service programming based on a selective binding segment of segment routing.

The technical objectives of the present invention are not limited to the above, and other objectives may become apparent to those of ordinary skill in the art based on the following descriptions.

According to various embodiments of the present invention, there is provided a method by which a first service programmable network (SPN) node operates in a communication system, the method including: receiving a first packet from a zeroth SPN node; identifying a segment routing header (SRH) of the first packet, the SRH including a segment list; identifying a selective binding segment based on the segment list; requesting a processing result from a network service function (NSF) corresponding to the segment list when the segment list involves the selective binding segment; receiving a color value according to the processing result from the NSF; dynamically selecting a segment list according to the color value; and transmitting a second packet, to which a new SRH including the selected segment list and a new header are added, to a second SPN node.

According to various embodiments of the present invention, there is provided a method by which a zeroth service programmable network (SPN) node operates in a communication system, the method including: adding a segment routing header (SRH) including a segment list for a network path to a packet; and transmitting the packet to a first SPN.

According to various embodiments of the present invention, there is provided a method by which a second service programmable network (SPN) node operates in a communication system, the method including: receiving a packet, to which a segment routing header (SRH) including a selected segment list is added, from a first SPN; identifying whether a segment to be processed is present based on the SRH; and deleting the SRH of the received packet when the segment to be processed is absent.

According to various embodiments of the present invention, there is provided an apparatus, which is a first service programmable network (SPN) node in a communication system, the apparatus including: an SPN application; and an SPN controller operatively connected to the SPN application; wherein the SPN controller is configured to: receive a first packet from a zeroth SPN; identify a segment routing header (SRH) of the first packet, the SRH including a segment list; identify a selective binding segment based on the segment list; request a processing result from a network service function (NSF) corresponding to the segment list when the segment list involves the selective binding segment; receive a color value according to the processing result from the NSF; dynamically select a segment list according to the color value; and transmit a second packet, to which a new SRH including the selected segment list and a new header are added, to a second SPN node.

BRIEF DESCRIPTION OF THE DRAWINGS

FIG. 3 illustrates an example of SR policy information of a node C according to an embodiment of the present disclosure.

DETAILED DESCRIPTION OF EXEMPLARY EMBODIMENTS

Terms used herein are used for describing particular embodiments and are not intended to limit the scope and spirit of the present invention. It should be understood that the singular forms "a" and "an" also include the plural forms unless the context clearly dictates otherwise. Terms (including technical and scientific terms) used herein have the same meaning as commonly understood by those of ordinary skill in the art to which this invention belongs. It will be further understood that terms, such as those defined in commonly used dictionaries, should be interpreted as having a meaning that is identical or similar as their meaning in the context of the relevant art and will not be interpreted in an idealized or overly formal sense unless expressly so defined herein. In some cases, even terms defined in the present disclosure cannot be construed to exclude embodiments of the present disclosure In various embodiments of the present disclosure described below, a hardware approach is illustrated by way of example. However, since the various embodiments of the present disclosure include technology using both hardware and software, the various embodiments of the disclosure do not exclude a software-based approach.

In the following description, the present disclosure relates to an apparatus and method for providing dynamic network programming based on a selective binding segment of segment routing in a communication system. Specifically, the present disclosure describes a technology that, in order to provide the optimal connectivity according to various service characteristics and network requirements in a communication system, dynamically provides network service programming based on a selective binding segment of segment routing.

In the following description, terms referring to signals, terms referring to channels, terms referring to control information, terms referring to network entities, terms referring to components of a device, and the like are used for illustrative purposes only for the sake of convenience of description. Accordingly, the present disclosure is not limited to the terms described below, and other terms having equivalent technical meanings may be used.

In addition, although the present disclosure describes various embodiments using terms used in some communication standards (e.g., 3$^{rd}$ Generation Partnership Project (3GPP)), this is only an example for description. Various embodiments of the present disclosure may be easily modified and applied to other communication systems.

Figure 1:
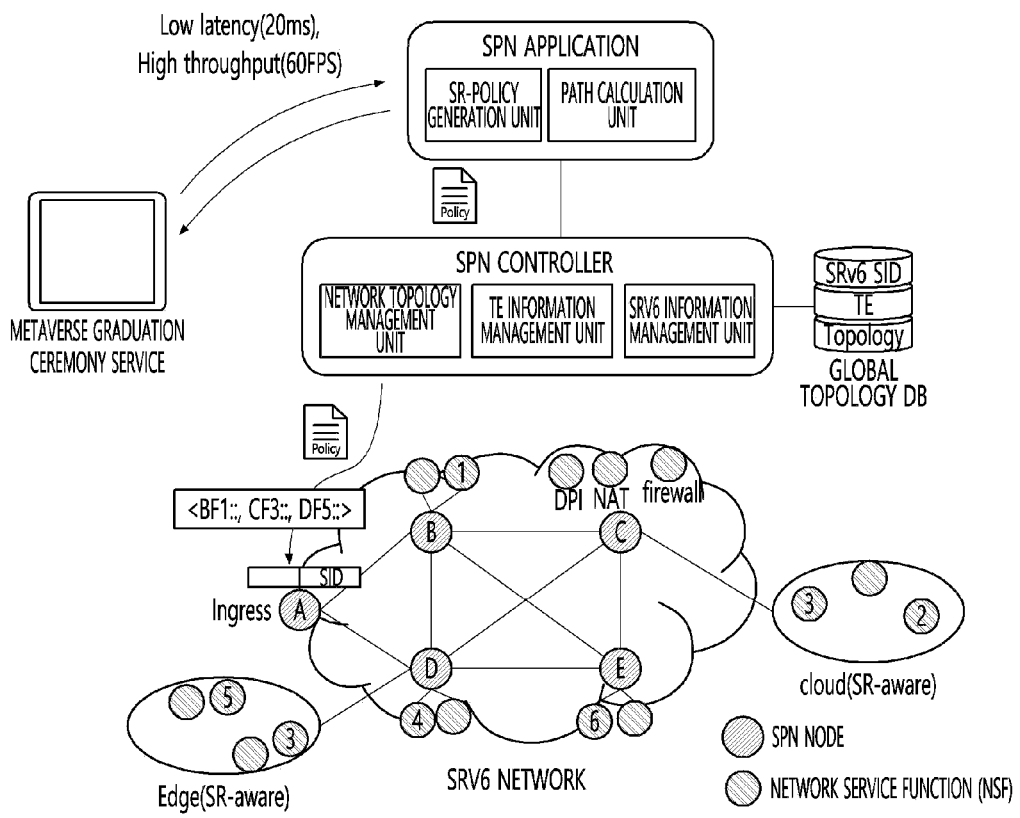
FIG. 1 illustrates a conceptual diagram of a service programmable network according to various embodiments of the present disclosure.

FIG. 1 illustrates a conceptual diagram of a service programmable network according to various embodiments of the present disclosure. FIG. 1 is illustrated assuming a wired communication system, but the present disclosure is not limited thereto.

Referring to FIG. 1, a service programmable network (SPN) includes SPN nodes of an SRv6 network, network service functions (NSFs), an SPN controller, an SPN application, and a plurality of client terminals.

The SPN nodes A, B, C, D, and E may be network routers that forward packets based on service path information defined in a segment routing header (SRH), which is a routing extension header of an IPv6 header.

Examples of the NSF, which is a network service function, include various application-specific functions, such as deep packet inspection (DPI), network address translation (NAT), firewall, video optimizer, and the like. An NSF may be operated in various forms in a network capable of performing functions, such as a SRv6 network node, edge computing, and cloud, and may serve as one SPN node by performing SRH processing.

The SPN controller may control and manage the operation of the SPN node, and may include a network topology management unit, a traffic engineering (TE) information management unit, and an SRv6 information management unit. The network topology management unit may collect connection information of SPN nodes, the TE information management unit may collect network TE state information, and the SRv6 information management unit may collect segment identifier (SID) information of nodes. The SPN controller may generate and manage a global topology DB from information collected by each of the network topology management unit, the TE information management unit, and the SRv6 information management unit.

The SPN application may receive a service request from a client terminal of a user. A path calculation unit of the SPN application may calculate an optimal service delivery path that satisfies service request conditions and network state information. An SR-policy generation unit of the SPN application may generate an SRv6 policy for the calculated path and transfer the SRv6 policy to the SPN controller.

The client terminal may be a device, such as a smart phone, a tablet personal computer (PC), or a laptop computer, through which a user requests a service and receives a response.

FIG. 1 illustrates a procedure for receiving a service using an SPN network for a user to attend a metaverse graduation ceremony as an example.

Referring to FIG. 1, the user may select a metaverse graduation ceremony service in the client terminal. In this case, the SPN application may transmit requirements that the service should be provided with low latency within 20 ms at a frame rate of 60 frames per second (fps) in consideration of the metaverse service characteristics. The SPN application may calculate the optimal service path that satisfies the network requirements based on the global topology DB information managed by the SPN controller. Thereafter, the SPN application may generate an SRv6 policy including a segment (or a segment identifier: SID) list that represents path and function information of nodes through which a packet is transferred, and transmit the generated SRv6 policy. Each segment is a path between nodes from a source address (SA) to a destination address (DA), and each node may transfer traffic through the corresponding path. According to an embodiment, a configured segment list may be <BF1::, CF3::, DF5::>, in which "BF1::" may represent NSF F1 processing at a node B.

Figure 2:
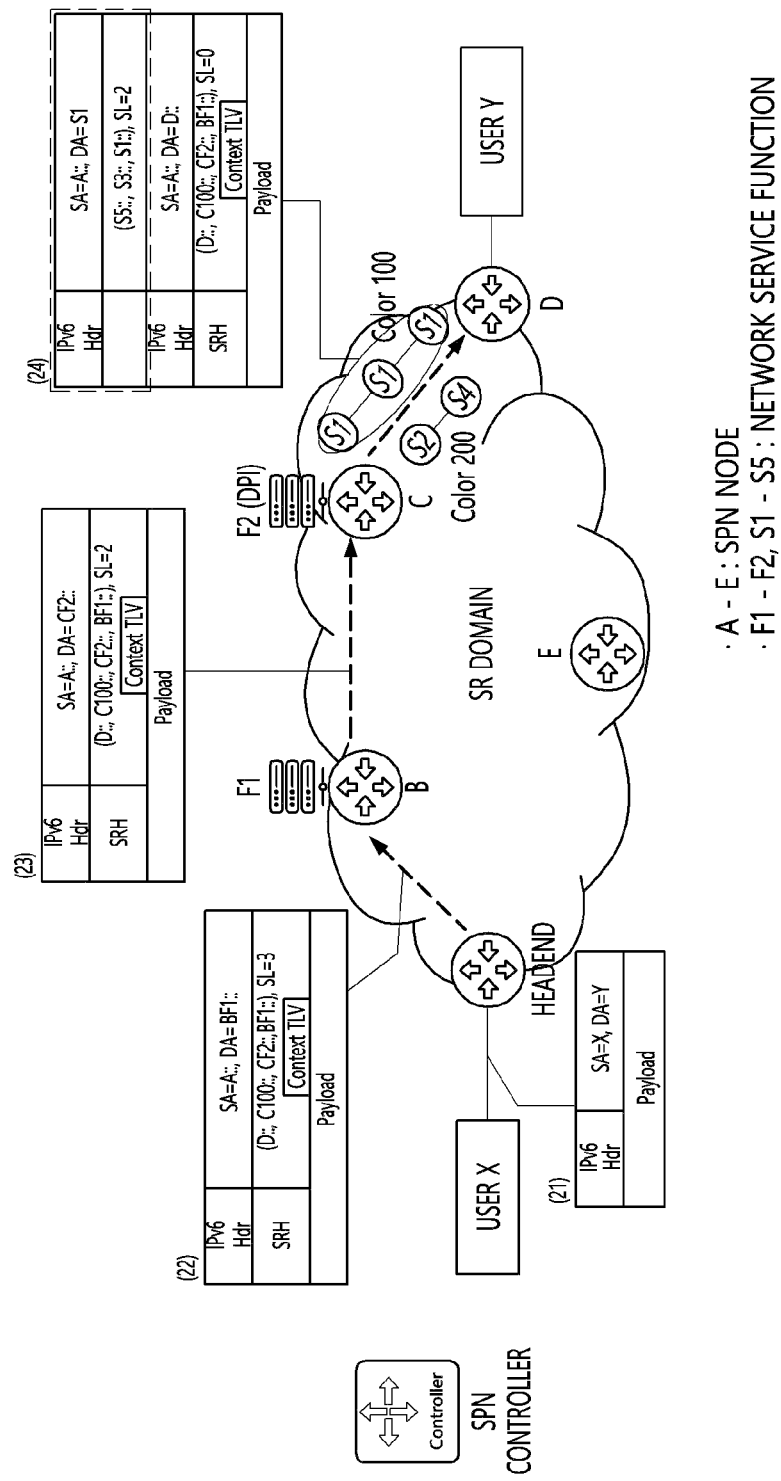
FIG. 2 illustrates an overall configuration diagram of a system for providing dynamic network programming based on a selective binding segment according to various embodiments of the present disclosure.

FIG. 2 illustrates an overall configuration diagram of a system for providing dynamic network programming based on a selective binding segment according to various embodiments of the present disclosure.

The system shown in FIG. 2 may include SPN nodes A to E, NSFs F1, F2, and S1 to S5, an SPN controller, and an application, and communication between a user X and a user Y may be performed through a SRv6 domain.

The nodes A to E may be SPN nodes of an SR domain that allow segment routing. A headend node A may add an SRH including a segment list for a network path to an IPv6 packet based on an SRv6 set by the SPN controller, and forward the packet to the network.

The nodes B and C may manage the NSFs F1 and F2, respectively, and may advertise SIDs of the NSFs F1 and F2 to the network in advance. The NSFs F1 and F2 may, upon receiving an SR packet from the nodes, perform the corresponding function and return a processing result to the requesting nodes. According to a color value based on the returned NSF processing result, an NSF list from S1 to S5 between the nodes C and D may be selected. For example, when F2 is an NSF that performs deep packet inspection (DPI), and an intrusion is detected as a result of DPI (an intrusion detection system: IDS), F2 may return a color value of 100 to the node C. The node C may redirect the packet according to a service path S1-S3-S5 set for the color 100 and transmit an alert. When the result of performing the DPI is normal, F2 may return a color value of 200 to the node C, and leave a log about the corresponding information according to a service S2-S4, which is set for a color value of 200. That is, a service may be selectively executed as a service S1-S3-S5 in case of a color value of 100 and as a service S2-S4 in the case of a color value of 200 according to the color value of the F2 execution result at the node C.

The node D located at the end of the SR domain may, when there is no SR segment to be processed, delete the SRH of the received packet and transfer the packet to the original destination Y.

A binding segment (or a BSID) is a segment that allows the BSID to be replaced with a segment list at a specific node, and packets may be transferred according to an SR policy defined with the BSID.

A selective binding segment (or a selective-BSID) may expand a BSID to dynamically determine a segment list for a next path among a plurality of candidate paths according to a color value resulting from NSF processing at an intermediate node that routes a segment and allow a new SRH and a new IPv6 header to be added.

Currently, a selective type length value (TLV) object defined in an SRH may include a padding TLV and a hash-based message authentication (HMAC) TLV, and additional TLVs may be defined and used. In order to deliver information about the result of processing the selective binding segment, a 32-bit context TLV, which is a new selective TLV, may be defined in an SRH. Therefore, when there is a selective binding segment in a segment list, a headend node may generate a context TLV field in an SRH and transfer the packet, and a node processing the selective binding segment may update a service color value of a NSF processing result into the context TLV and transfer the packet.

FIG. 3 illustrates an example of SR policy information of the node C according to an embodiment of the present disclosure. The Node C may represent an intermediate node of a network path.

The present disclosure defines a selection mode such that determination on a plurality of segment lists is processed not by load balancing based on the weight as in the existing method but by a color value generated according to NSF processing, and other forms of expression with the same objective are also possible. BSID "C100::" is a selective binding segment in which candidate paths CP1 and CP2 are defined, and selective modes are defined in the candidate paths. In the case of the candidate path CP2 whose selection mode is 0, a weight-based segment list for load balancing is selected, which is a default operation. That is, a segment list of a color value 300 is selected by load-balancing according to the weight. In the case of the candidate path CP1, whose selection mode is 1, a segment list is dynamically selected according to a service color. That is, an SR policy POL100 corresponding to a color value of 100, which results from F2 processing of the node C, is selected, and the corresponding segment list may be S1-S3-S5.

Referring to FIGS. 2 and 3, the detailed operation of the selective binding segment is as follows.

A user X may be connected to a user Y for communication. In this case, an IPv6 packet header may be composed of a source address (SA)=X and a destination address (DA)=Y (21).

The headend node A may generate an SRH by classifying input traffic according to service characteristics, add a segment list in the SRH, and forward a packet (22). In the case of FIG. 2, the segment list is <BF1::,CF2::,C100::,D::>, and the packet may be transferred in the order of the node A, the node B, the node C, and the node D. "BF1::" may indicate F1 performed at the node B, and "CF2::" may indicate F2 performed at the node C. In the segment list generated by the node A, "C100::" represents a selective binding segment, and the node A generates a Context TLV field in the SRH to deliver information about an NSF processing result.

The node B may receive the packet whose DA is "BF1::" (matching an active segment of the SRH), process F 1, update a segment left (SL) in the SRH and the DA, and transfer the packet to the node C (23).

The node C receives the packet whose DA is "CF2::," and requests F2 processing, and the NSF F2 returns a service color value of "100" resulting from processing as a context TLV. In the node C, a candidate path with the highest priority according to the preference is selected among candidate paths of the SR policy, the selected candidate path has a selection mode of 1, and a segment list <S1::,S3::,S5::> is dynamically selected according to a service color value "100." The selected segment list <S1::,S3::,S5::> allows a packet with a new SRH and a new IPv6 header to be transferred to the next segment, S1 (24).

Figure 4:
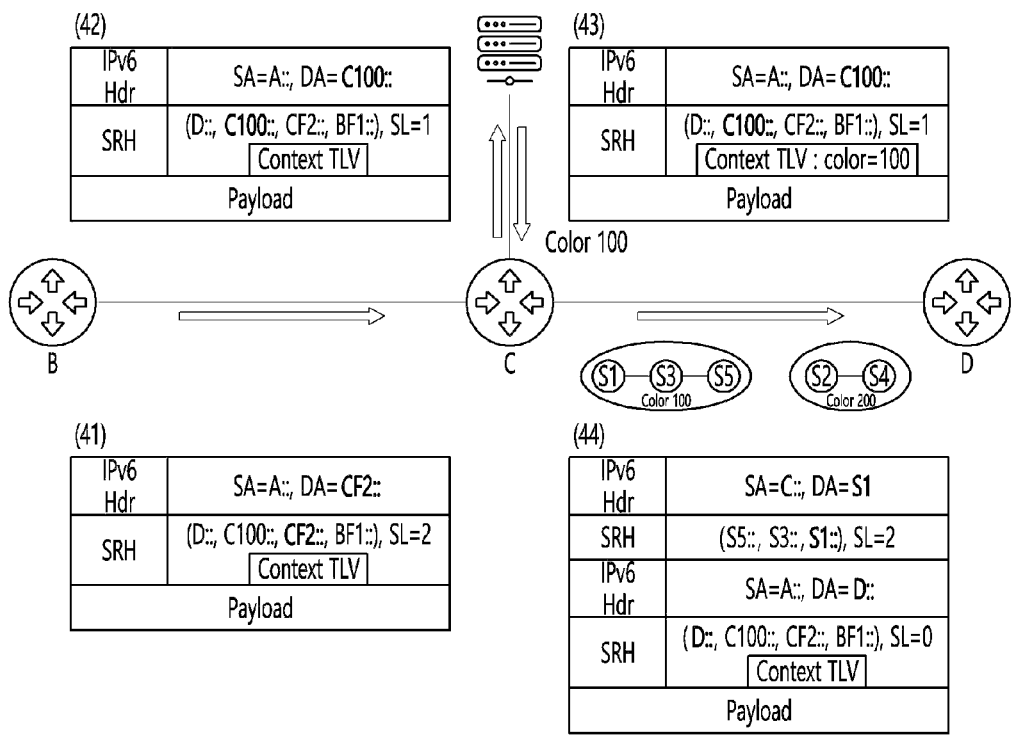
FIG. 4 illustrates detailed operations of a node C according to an embodiment of the present disclosure.

FIG. 4 illustrates detailed operations of the node C according to an embodiment of the present disclosure.

Referring to FIG. 4, when the node C receives a packet whose DA is "CF2::" from the node B (41), the node C may transfer the packet to an NSF F2 and request corresponding NSF processing (42). In this case, since the DA is "C100::," which is a selective binding segment, the node C requests a color value for the processing result. The NSF F2 may perform the corresponding NSF processing and return a service color value of "100" for the processing result to the node C as a context TLV of an SRH (43). Since this is the result of a request of the selective binding segment, the NSF F2 may keep the DA in the IPv6 header unchanged as "C100::."

When the node C receives the packet from the NSF F2 (43), the node C dynamically selects a segment list <S1::, S3::,S5::> according to the color value of "100" among a plurality of segment lists for candidate paths, and forward the packet by adding a new SRH and a new IPv6 header (44). According to an embodiment, the newly added IPv6 header is set to have a DA as S1, allowing the packet to be transferred to the NSF S1.

Figure 5:
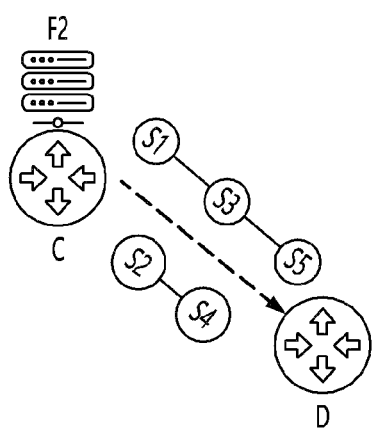
FIG. 5 illustrates a packet forwarding procedure between network services added with a selective binding segment according to an embodiment of the present disclosure.
Figure 5:
Figure 5:
Figure 5:

FIG. 5 illustrates a packet forwarding procedure between network services added with a selective binding segment according to an embodiment of the present disclosure.

Referring to FIG. 5, the NSF S1 may receive the packet of DA=S1 from the node C and process a corresponding service (51).

The NSF S1 may update the SL and the DA in the newly added SRH and forward the packet to the NSF S3 (52). The NSF S3 may also perform the corresponding service, update the SL and the DA, and forward the packet to the NSF S5 (53).

The NSF S5 may process the corresponding service, delete the SRH and the IPv6 header, which are added according to the selective binding segment, and forward the packet to the node D (54).

The node D may delete the SRH and transfer the packet to the user Y. As described above, the service request of the user X may be processed in the SR domain and transferred to the user Y, so that service processing may be completed.

Figure 6:
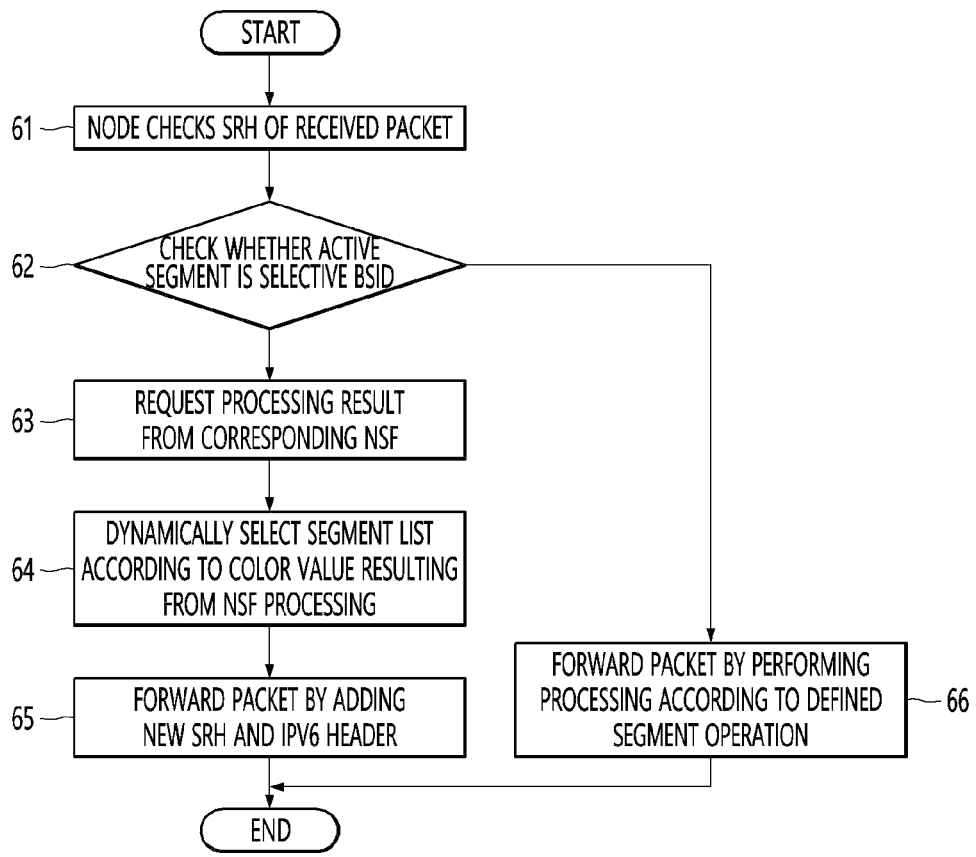
FIG. 6 illustrates a first operating method of an SPN node according to an embodiment of the present disclosure.

FIG. 6 illustrates a first operating method of an SPN node according to an embodiment of the present disclosure. The SPN node shown in FIG. 6 may be an intermediate node in a network path.

Referring to FIG. 6, the SPN node may check an SRH of a received packet (61).

The SPN node may check whether an active segment is a selective BSID (62).

When the active segment is a selective BSID, the SPN node may request a processing result from a corresponding NSF (63).

When the active segment is not a selective BSID, the SPN node may perform processing according to the defined segment operation and forward the packet (66).

The SPN node may perform NSF processing according to the selective BSID and dynamically select a segment list in an SR policy according to a resulting color value (64).

Then, the SPN node may forward the packet by adding a new SRH and a new IPv6 header (65).

Figure 7:
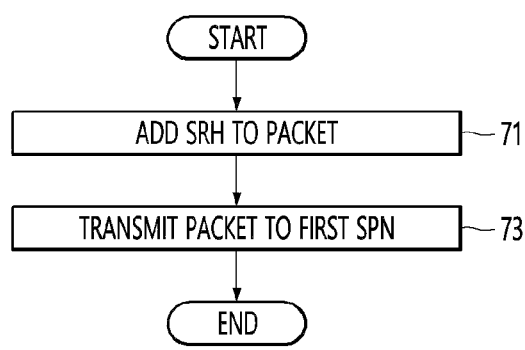
FIG. 7 illustrates a second operating method of an SPN node according to an embodiment of the present disclosure.

FIG. 7 illustrates a second operating method of an SPN node according to an embodiment of the present disclosure. The SPN node shown in FIG. 7 may be a first node (a headend node) in a network path.

Referring to FIG. 7, the SPN node may add an SRH including a segment list for a network path to a packet (71). According to an embodiment, the segment list may be generated by classifying input traffic according to service characteristics. In addition, when a selective binding segment is included in the segment list, the SPN node may generate a TLV field in the SRH and transmit the packet.

The SPN node may transmit the packet to the first SPN node (73).

Figure 8:
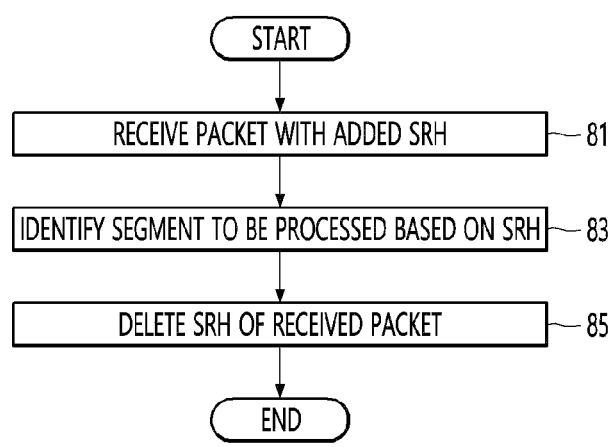
FIG. 8 illustrates a third operating method of an SPN node according to an embodiment of the present disclosure.

FIG. 8 illustrates a third operating method of an SPN node according to an embodiment of the present disclosure. The SPN node shown in FIG. 8 may be the last node (an end node) in the network path.

Referring to FIG. 8, the SPN node may receive the packet to which the SRH including the selected segment list is added from the SPN node shown in FIG. 7 (81).

The SPN node may identify whether there is a segment to be processed based on the SRH (83).

When there is no segment to be processed, the SPN node may delete the SRH of the received packet (85).

Figure 9:
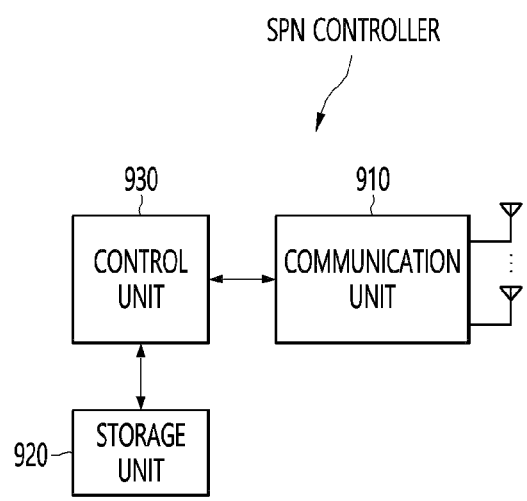
FIG. 9 illustrates a block diagram of an SPN controller in a communication system according to various embodiments of the present disclosure.

FIG. 9 illustrates a block diagram of an SPN controller in a communication system according to various embodiments of the present disclosure. Components illustrated in FIG. 9 may be understood as components of an SPN controller. The term "unit" or "device" used in the following description may refer to a unit of processing one or more functions or operations, and may be implemented as hardware or software or a combination of hardware and software.

Referring to FIG. 9, the SPN controller may include a communication unit 910, a storage unit 920, and a control unit 930.

The communication unit 910 may perform functions for transmitting and receiving signals through wired and wireless channels. For example, the communication unit 910 may include a transmit filter, a receive filter, an amplifier, a mixer, an oscillator, a digital-analog converter (DAC), an analog-digital converter (ADC), and the like.

In addition, the communication unit 910 may include a plurality of transmission/reception paths. Furthermore, the communication unit 910 may include at least one antenna array including a plurality of antenna elements. In terms of hardware, the communication unit 910 may include a digital circuit and an analog circuit (e.g., a radio frequency integrated circuit (RFIC)). Here, the digital circuit and the analog circuit may be implemented in one package. In addition, the communication unit 910 may include multiple RF chains.

The communication unit 910 transmits and receives signals as described above. Accordingly, all or part of the communication unit 910 may be referred to as a "transmitter," a "receiver," or a "transceiver." In addition, in the following description, transmission and reception performed through a wired/wireless channel may be used to mean that the above-described processing is performed by the communication unit 910.

The storage unit 920 may store data, such as a basic program, an application program, and setting information for operating the SPN controller. The storage unit 920 may include a volatile memory, a non-volatile memory, or a combination of volatile and non-volatile memories. In addition, the storage unit 920 may provide stored data according to a request of the control unit 930.

The control unit 930 may control overall operations of the SPN controller. For example, the control unit 930 may transmit and receive signals through the communication unit 910. In addition, the control unit 930 may write or read data to or from the storage unit 920. The control unit 930 may perform functions of a protocol stack required by communication standards. To this end, the control unit 930 may include at least one processor or microprocessor, or may be a part of a processor. In addition, a part of the communication unit 910 and the control unit 330 may be referred to as a communication processor (CP).

According to various embodiments, the control unit 930 may control the SPN controller to perform operations according to various embodiments of FIGS. 6 to 8 described above.

Methods according to the claims of the present disclosure or the embodiments described in the specification may be implemented in hardware, software, or a combination of hardware and software.

When implemented in software, a computer-readable storage medium storing one or more programs (software modules) may be provided. One or more programs stored on a computer-readable storage medium are configured for execution by one or more processors in an electronic device. The one or more programs include instructions that cause the electronic device to perform the methods in accordance with the claims of the present disclosure or the embodiments described in the specification.

Such programs (software modules, software) may be stored in a random access memory, a non-volatile memory including a flash memory, a read only memory (ROM), an electrically erasable programmable read only memory (EEPROM), a magnetic disc storage device, a compact disc-ROM (CD-ROM), a digital versatile disc (DVD), or other types of optical storage devices, or a magnetic cassette. Alternatively, the programs may be stored in a memory composed of a combination of some or all thereof. In addition, each configuration memory may be included in plurality.

In addition, the programs may also be stored on attachable storage devices that may be accessed through communication networks, such as the Internet, an intranet, a local area network (LAN), a wide area network (WAN), or a storage area network (SAN), or a communication network composed of a combination of the communication networks.

Such a storage device may be connected to a device performing an embodiment of the present disclosure through an external port. In addition, a separate storage device on a communication network may be connected to a device performing an embodiment of the present disclosure.

In the specific embodiments of the present disclosure described above, components included in the disclosure are expressed in a singular or plural form according to the specific embodiments presented. However, the singular or plural expression is appropriately selected for the context presented for convenience of description, and the present disclosure is not limited to the singular or plural component, and even a component expressed in a plural form may be composed of a singular component, and even a component expressed in singular form may be composed of a plurality of components.

As is apparent from the above, an apparatus and method according to various embodiments of the present disclosure enable an optimal segment list to be selected from among various options of a segment routing (SR) policy according to a result of network service function (NSF) processing during service routing based on a programmable selective binding segment, and thus the best path according to service characteristics and network requirements can be dynamically provided.

The effects of the present disclosure are not limited to the effects described above, and other effects that are not described will be clearly understood by those skilled in the art from the above detailed description.

Meanwhile, although specific embodiments have been described in the detailed description of the present disclosure, various modifications are possible without departing from the scope of the present disclosure. Therefore, the scope of the present disclosure should not be limited to the described embodiments and should be defined by the claims described below as well as the claims and equivalents.

What is claimed is:

1. A method by which a first service programmable network (SPN) node operates in a communication system, the method comprising:
   receiving a first packet from a zeroth SPN node;
   identifying a segment routing header (SRH) of the first packet, the SRH including a segment list;
   identifying a selective binding segment based on the segment list;
   requesting a processing result from a network service function (NSF) corresponding to the segment list when the segment list involves the selective binding segment;
   receiving a color value according to the processing result from the NSF;
   dynamically selecting a segment list according to the color value; and
   transmitting a second packet, to which a new SRH including the selected segment list and a new header are added, to a second SPN node.

2. The method of claim 1, wherein a segment list for one of a plurality of candidate paths is determined according to the color value.

3. The method of claim 1, wherein the transmitting of the second packet, to which the new SRH including the selected segment list and the new header are added, to the second SPN node includes determining a new SRH according to the color value.

4. The method of claim 1, wherein the first packet includes policy information about segment routing, and the policy information includes information about a selection mode.

5. The method of claim 4, wherein the segment list is determined according to the information about the selection mode.

6. The method of claim 1, further comprising transmitting a segment identifier (SID) corresponding to the NSF to a network in advance.

7. The method of claim 1, wherein the transmitting of the second packet, to which the new SRH including the selected segment list and the new header are added, to the second SPN node includes updating the color value into a context type length value (TLV), wherein the context TLV is included in the new SRH.

8. The method of claim 1, wherein the identifying of the selective binding segment based on the segment list includes transmitting the packet to the first SPN according to a defined segment operation when the segment list does not involve the selective binding segment.

9. An apparatus, which is a first service programmable network (SPN) node in a communication system, the apparatus comprising:
   an SPN application; and
   an SPN controller operatively connected to the SPN application;
   wherein the SPN controller is configured to:
     receive a first packet from a zeroth SPN;
     identify a segment routing header (SRH) of the first packet, the SRH including a segment list;
     identify a selective binding segment based on the segment list;
     request a processing result from a network service function (NSF) corresponding to the segment list when the segment list involves the selective binding segment;
     receive a color value according to the processing result from the NSF;
     dynamically select a segment list according to the color value; and
     transmit a second packet, to which a new SRH including the selected segment list and a new header are added, to a second SPN node.

10. The apparatus of claim 9, wherein a segment list for one of a plurality of candidate paths is determined according to the color value.

11. The apparatus of claim 9, wherein, to transmit the second packet, to which the new SRH including the selected segment list and the new header are added, to the second SPN node, the SPN controller determines a new SRH according to the color value.

12. The apparatus of claim 9, wherein the first packet includes policy information about segment routing, and the policy information includes information about a selection mode.

13. The apparatus of claim 12, wherein the segment list is determined according to the information about the selection mode.

14. The apparatus of claim 9, wherein the SPN controller transmits a segment identifier (SID) corresponding to the NSF to a network in advance.

15. The apparatus of claim 9, wherein, to transmit the second packet, to which the new SRH including the selected segment list and the new header are added, to the second SPN node, the SPN controller updates the color value into a context type length value (TLV), and the context TLV is included in the new SRH.

16. The apparatus of claim 9, wherein, in order to identify the selective binding segment based on the segment list, the SPN controller transmits the packet to the first SPN according to a defined segment operation when the segment list does not involve the selective binding segment.

\* \* \* \* \*